(12) United States Patent
Chu et al.

(10) Patent No.: US 10,289,588 B2
(45) Date of Patent: May 14, 2019

(54) RISER CARD

(71) Applicant: Quanta Computer Inc., Taoyuan (TW)

(72) Inventors: Wei-Yi Chu, Taoyuan (TW); Chia-Feng Cheng, Taoyuan (TW); Kai Chang, Taoyuan (TW); Chih-Yu Chen, Taoyuan (TW)

(73) Assignee: Quanta Computer Inc., Taoyuan (TW)

( * ) Notice: Subject to any disclaimer, the term of this patent is extended or adjusted under 35 U.S.C. 154(b) by 151 days.

(21) Appl. No.: 15/199,504

(22) Filed: Jun. 30, 2016

(65) Prior Publication Data

US 2018/0004695 A1 Jan. 4, 2018

(51) Int. Cl.
*G06F 13/40* (2006.01)
*G06F 13/16* (2006.01)
*G06F 3/06* (2006.01)

(52) U.S. Cl.
CPC ........ *G06F 13/4022* (2013.01); *G06F 3/0688* (2013.01); *G06F 13/16* (2013.01); *G06F 13/4068* (2013.01); *G06F 13/4095* (2013.01)

(58) Field of Classification Search
CPC ... G06F 13/4022; G06F 13/16; G06F 13/4068
See application file for complete search history.

(56) References Cited

U.S. PATENT DOCUMENTS

| 2009/0063895 | A1 | 3/2009 | Smith |
| 2011/0219158 | A1 | 9/2011 | Davis et al. |
| 2014/0082142 | A1* | 3/2014 | Geffin .................. G06F 13/385 709/217 |
| 2014/0269471 | A1 | 9/2014 | Wagh et al. |
| 2015/0277512 | A1* | 10/2015 | Davis ..................... G06F 1/183 361/679.31 |
| 2017/0068630 | A1* | 3/2017 | Iskandar ............. G06F 13/4022 |
| 2017/0277230 | A1* | 9/2017 | Samper .................. G06F 1/183 |

FOREIGN PATENT DOCUMENTS

| CN | 203690574 U | 7/2014 |
| GB | 2523839 A | 9/2015 |
| JP | 2010-538372 A | 12/2010 |
| JP | 2012-178014 A | 9/2012 |
| JP | 2014-120667 A | 6/2014 |
| TW | M449368 U | 3/2013 |

(Continued)

OTHER PUBLICATIONS

Extended European Search Report for EP Application No. 17178359.0, dated Nov. 16, 2017.

(Continued)

*Primary Examiner* — Ernest Unelus
*Assistant Examiner* — Ronald T Modo
(74) *Attorney, Agent, or Firm* — Nixon Peabody LLP; Zhou Lu

(57) ABSTRACT

An apparatus having a first interface of a first type supporting a plurality of data ports, a second interface of a second type supporting at least a portion of the plurality data ports, and a third interface of the second type. The apparatus also including a switching module coupled to a control port of the first interface and configured for selectably coupling the plurality of data ports to at least one of the second interface and the third interface based on a signal at the control port.

11 Claims, 7 Drawing Sheets

(56) References Cited

FOREIGN PATENT DOCUMENTS

| TW | M474270 U | 3/2014 |
|---|---|---|
| TW | M488756 U | 10/2014 |
| TW | 201617915 A | 5/2016 |
| TW | 201621702 A | 6/2016 |
| WO | 2009-0032743 A2 | 3/2009 |
| WO | 2016068893 A1 | 5/2016 |

OTHER PUBLICATIONS

JP Office Action for Application No. 2017-123135, dated May 1, 2018, w/ First Office Action Summary.

\* cited by examiner

RISER CARD

FIELD

The subject matter herein generally relates to a riser card. More specifically, the subject matter herein relates to a riser card configured to convert one or more M.2 (previously known as Next Generation Form Factor (NGFF)) components to work with a U.2 connector (previously known as SFF-8639).

BACKGROUND

U.2 components, such as Non-Volatile Memory Express (NVMe) peripheral component interconnect express (PCIe) solid state drives (SSD), offer high performance, but are relatively new to market and thus have significant cost. M.2 (previously known as Next Generation Form Factor (NGFF)) components provide the functionality of a U.2 component with a much smaller form factor and at a significantly reduced cost. M.2 can support PCIe with lower power consumption, cost, and maintain a high performance.

BRIEF DESCRIPTION OF THE DRAWINGS

Implementations of the present technology will now be described, by way of example only, with reference to the attached figures, wherein.

DETAILED DESCRIPTION

Figure 1:
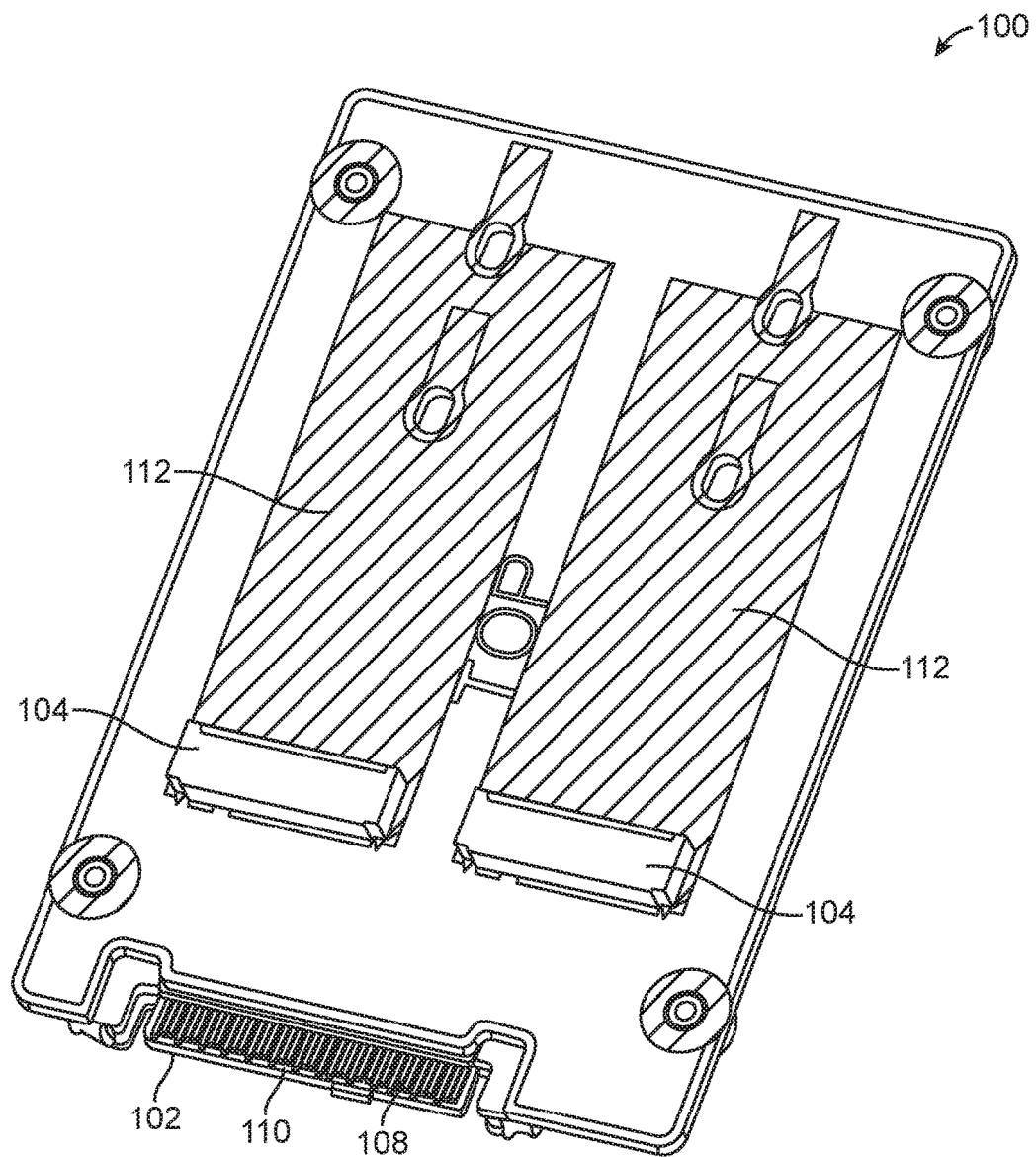
FIG. 1 is an isometric view of an example embodiment of a riser card with a first interface type and a second interface type in accordance with the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The present disclosure describes an apparatus having a first interface of a first type supporting a plurality of data ports, a second interface of a second type supporting at least a portion of the plurality data ports, and a third interface of the second type. A switching module coupled to a control port of the first interface and configured for selectably coupling the plurality of data ports to at least one of the second interface and the third interface based on a signal at the control port. The switching module selectably connecting the plurality of data ports to one of the second interfaces or diving the plurality of data ports between the two second interfaces.

While the present disclosure is presented with respect to a riser card capable of coupling one or more M.2 SSDs with a U.2 connector, it is within the scope of the disclosure to implement the present technology with other connectors, components, and/or switching modules.

Figure 2:
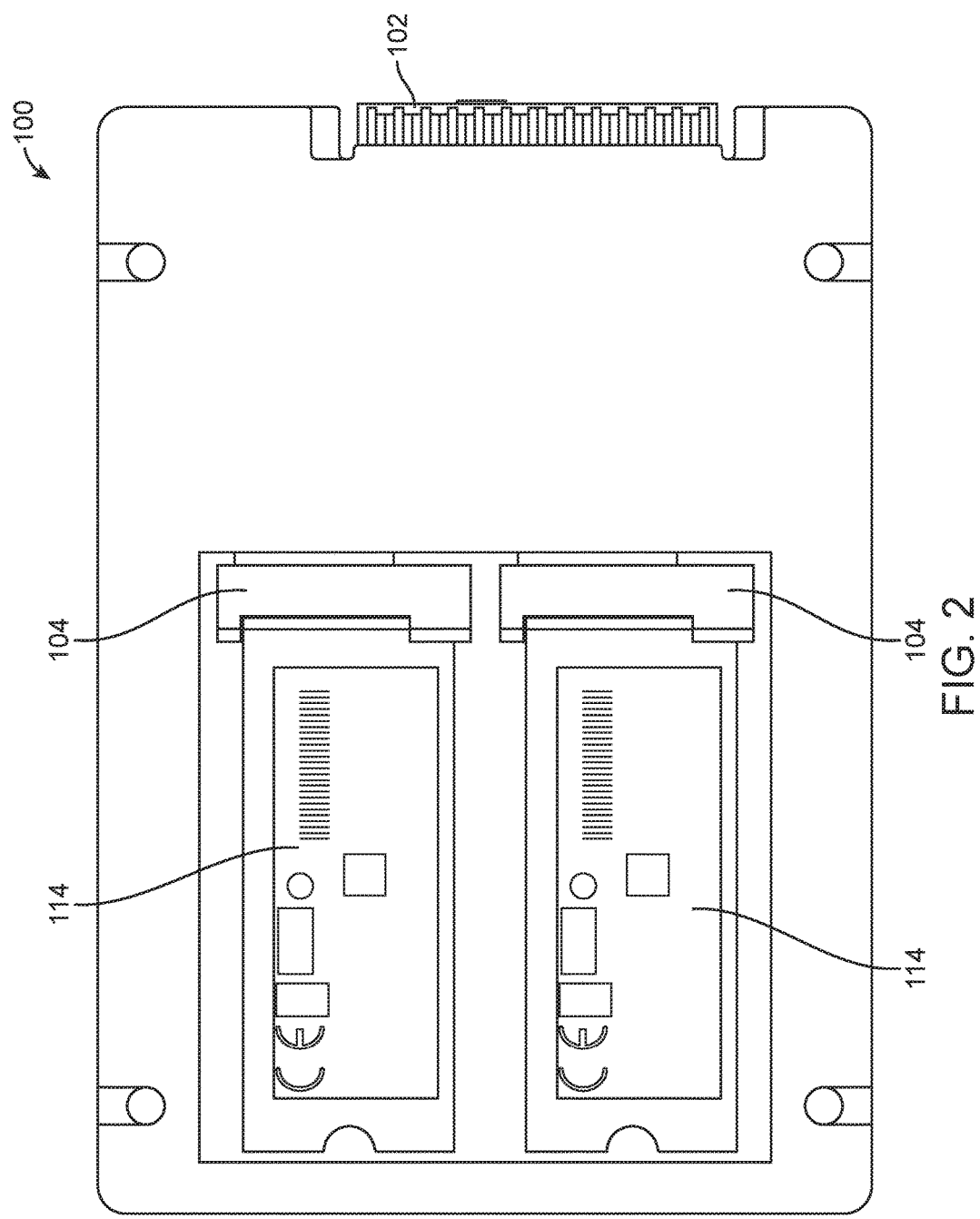
FIG. 2 is a front elevational view of an example embodiment of a riser card with a first interface type and a second interface type in accordance with the present disclosure.
Figure 3:
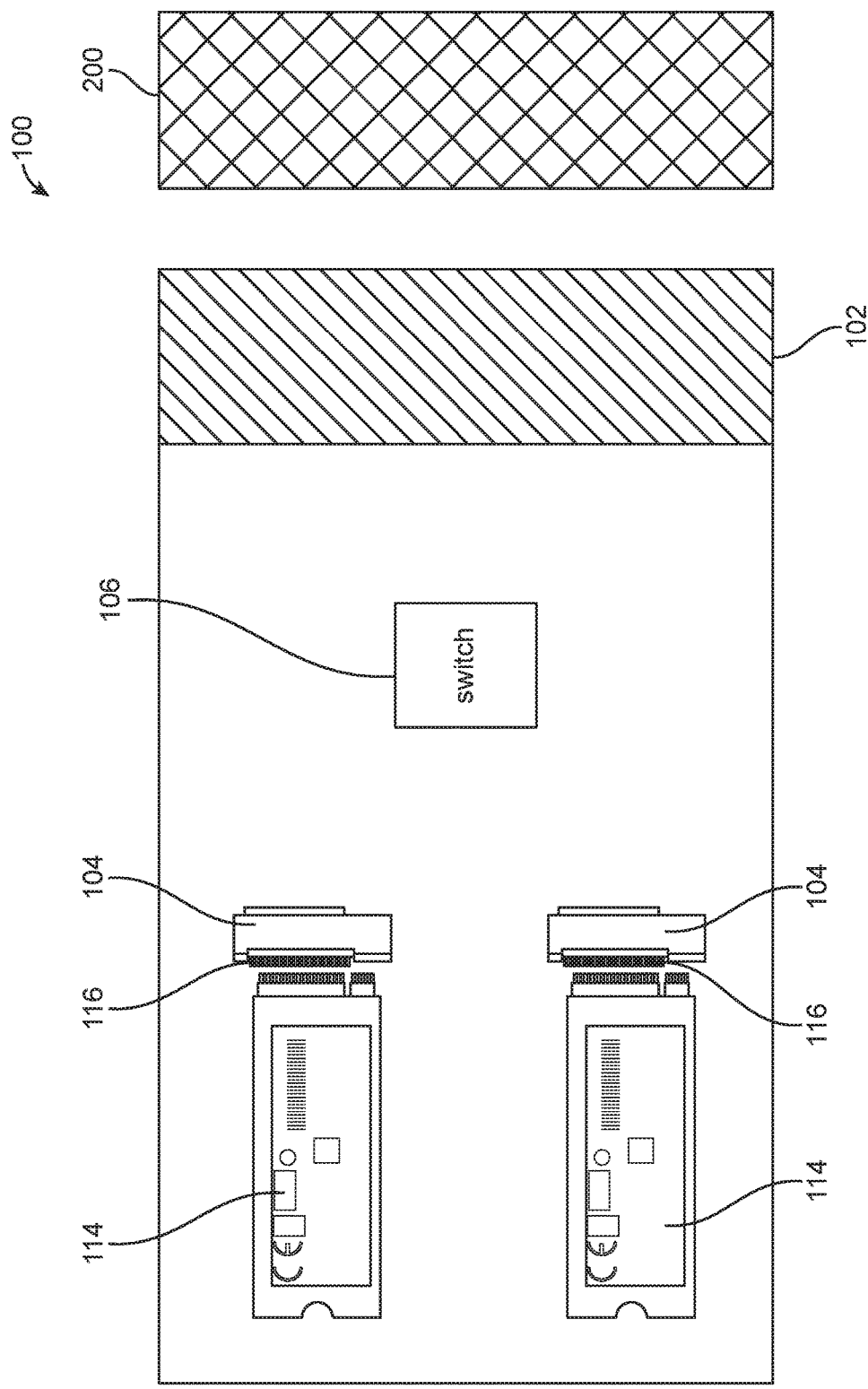
FIG. 3 is a diagrammatic view of a riser card with a first interface type and a second interface type in accordance with the present disclosure.

FIGS. 1-3 illustrate a riser card 100 have a first interface 102, two second interfaces 104, and a switching module 106. The first interface 102 can have a plurality of data ports 108 capable of transmitting data between the first interface 102 and the second interface 104. The first interface 102 can have a control port 110 configured to selectably couple the plurality of data ports 108 to at least one of the second interfaces 104 based on a signal at the control port 110.

The first interface 102 and the second interfaces 104 can be of two different types, the first interface having a first type and the second interfaces having a second type. In at least one embodiment, the first interface 102 type is an NVMe SSD interface configured to be received in a U.2 connector and the second interface 104 type 104 are M.2 interfaces.

The riser card 100 can have two receiving portions 112 corresponding to each of the two second interfaces 104. The receiving portions 112 can be configured to receive a component 114 (shown in FIG. 3), such as an M.2 PCIe SSD at least including three length types of M.2. PCIe SSD 2242, 2260, and 2280 as specified in the M.2 standard. The riser card 100 can be configured to selectively receive a component 114 in either of the two receiving portions 112, or both. As can be appreciated in FIG. 3, the first interface 102 can be receivable into a U.2 connector 200 disposed on an electronic device (not shown). The first interface 102 can electronically couple with the U.2 connector 200 allowing the two second interfaces 104 to send and receive data with the electronic device through the first interface 102.

The plurality of data ports 108 can be any number of data ports, such as two, four, six, or any other number. In the illustrated embodiment, the riser card 100 has four data ports coupling the first interface 102 with the second interfaces 104. The switching module 106 can allocate the plurality of data ports 108 between the first interface 102 and the two second interface 104. A user can control the switching module 106 to best allocate the plurality of data ports 108 according to their desired use, the installed components, and the performance required.

The riser card 100 can have a component 114 received in a second interface 104 allowing allocation of the plurality of data ports 108 to the component 114. The riser card 100 can receive two components 114 requiring the switching module 106 to allocate the plurality of data ports 108 among the two components 114 received in the second interfaces 104.

In at least one embodiment, the riser card 100 can receive two components, and a user can allocate the plurality of ports 108 between the two received components 114 allowing utilization of one, or a combination of received components 114.

The riser card 100 can support hot-swapping of components 114 received in the second interfaces 104. Hot-swapping allows components to be removed, inserted, or replaced from the second interface 104 without removing power from the riser card 100. In at least one embodiment, the riser card 100 is received within an electronic device and hot-swapping allows one or more components 114 to be inserted or removed from the riser card 100 without powering down the electronic device.

Hot-swapping can be implemented using existing pin arrangements with the first interface 102. In the illustrated embodiment, the first interface is a U.2 connector, which can thereby implement P12V and P3V2_STBY. The first interface 102 can apply the metal-oxide-semiconductor field-effect transistor (MOSFET) to achieve isolation of power to and from the first interface 102. This isolation of power helps enable hot-swapping.

The riser card 100 can also implement Electrically Erasable Programmable Read-Only Memory (EEPROM) and hardware monitoring allowing temperature detection, voltage readings while following M.2 standard specifications. The EEPROM can include the FRU allowing a technician to maintain and repair the system.

Figure 4:
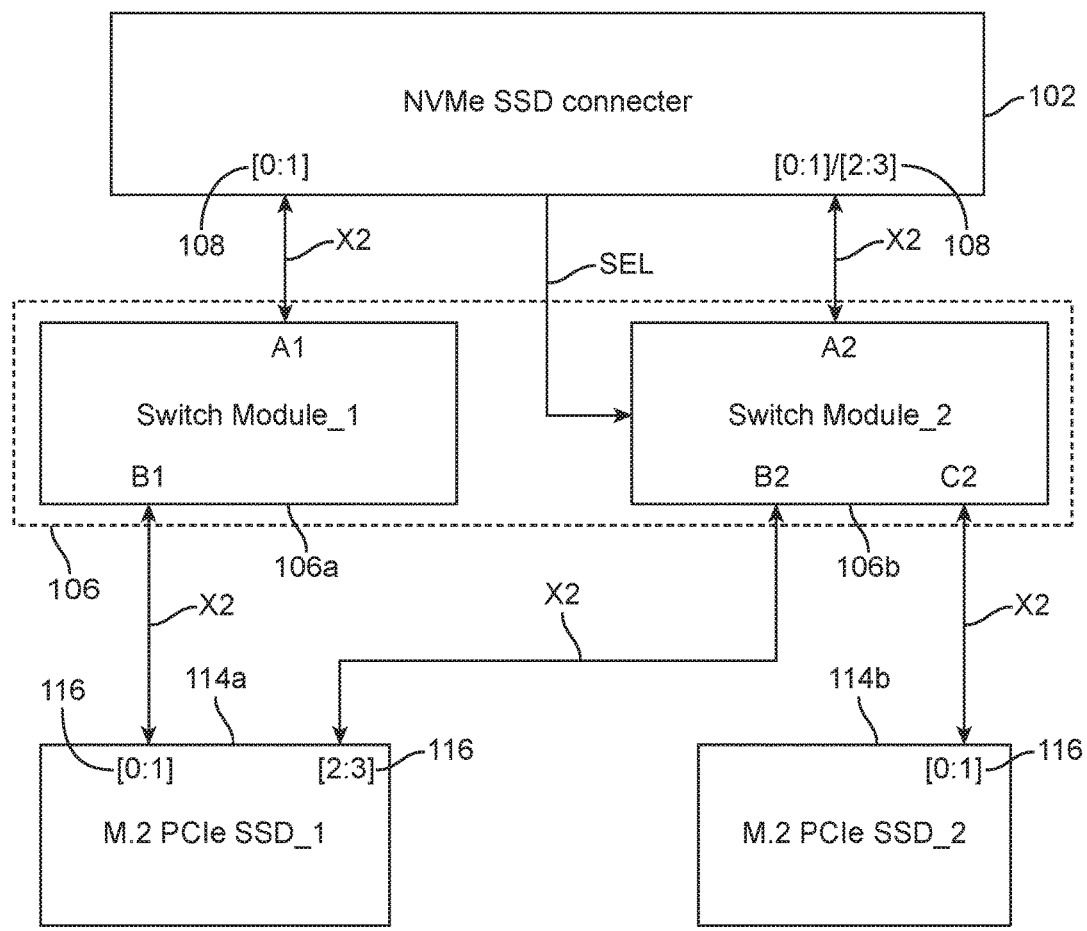
FIG. 4 is a diagrammatic view of a riser card system in accordance with the present disclosure.
Figure 5:
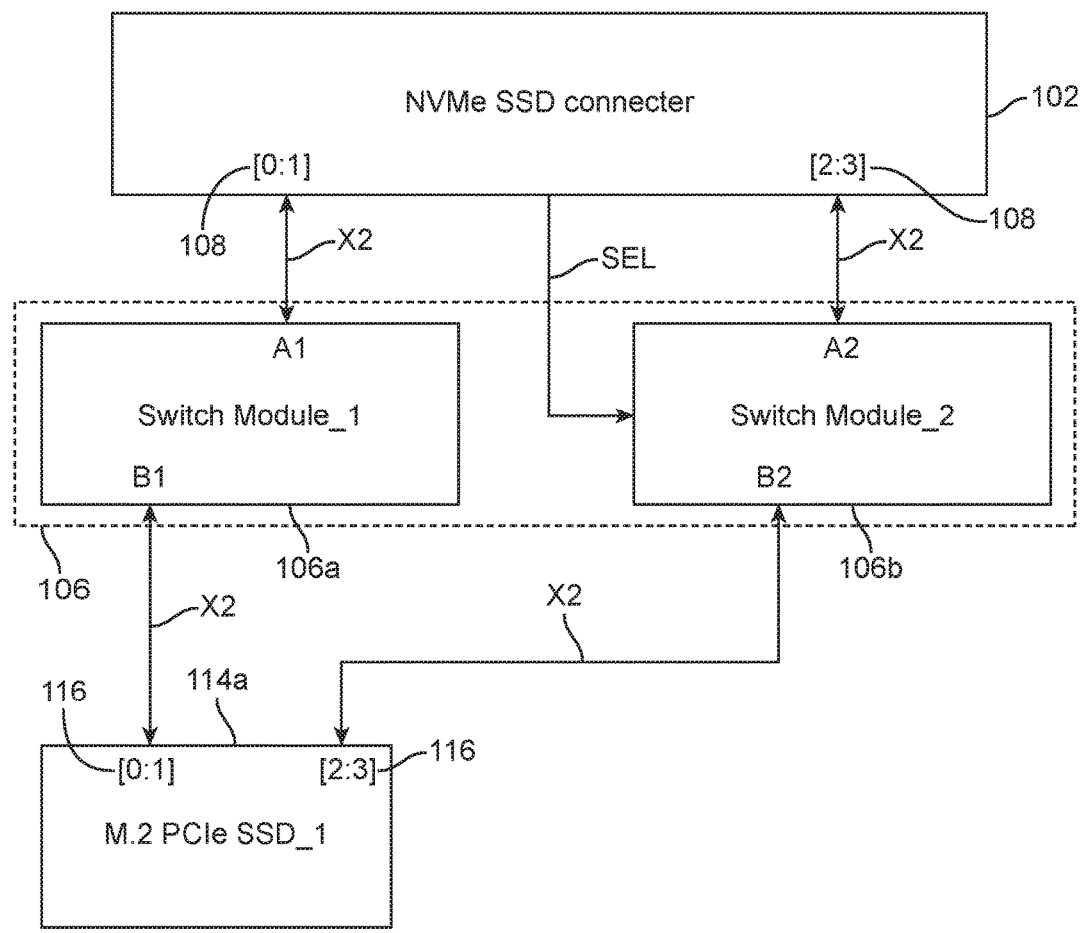
FIG. 5 is a diagrammatic view of a system in a first routing mode in accordance with the present disclosure.
Figure 6:
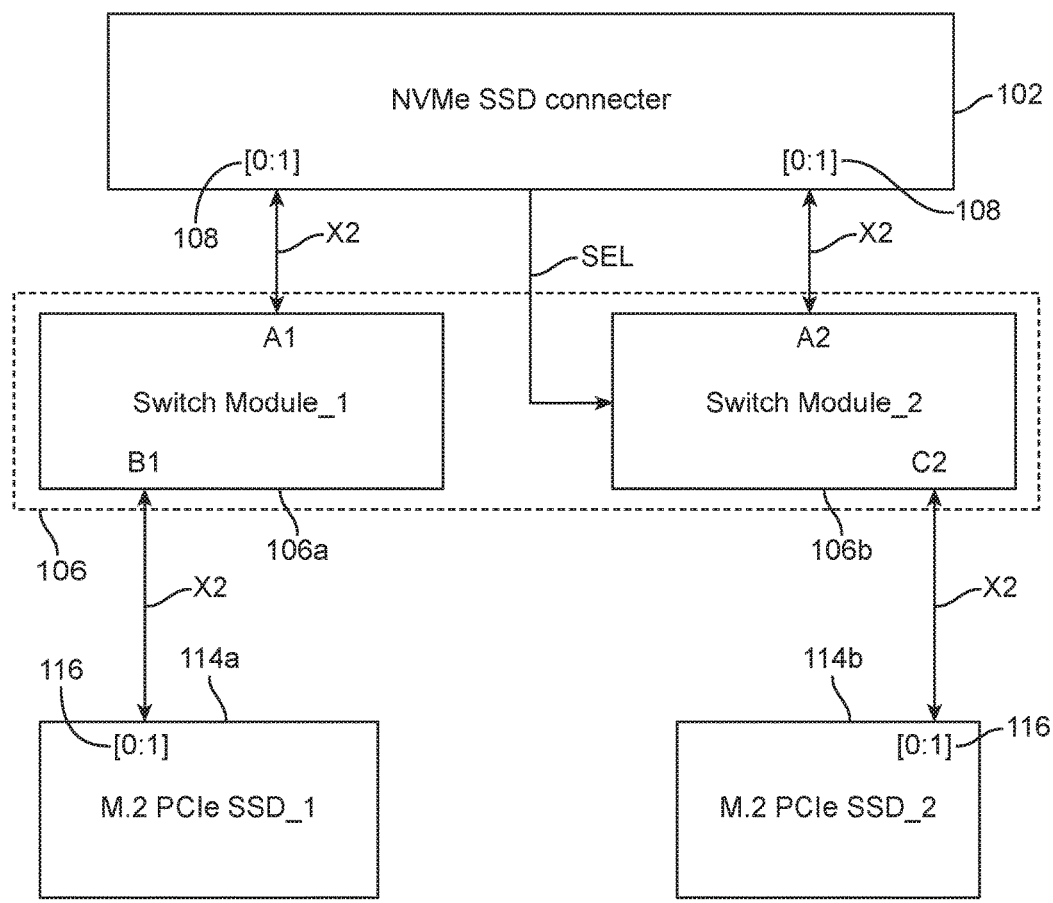
FIG. 6 is a diagrammatic view of a system in a second routing mode in accordance with the present disclosure.

FIGS. 4-6 illustrate a system diagram of the riser card 100 and the plurality of data ports 108. The system diagram shows mapping for the plurality of data ports coupling the first interface 102 with the two second interfaces 104. The first interface 102 and second interfaces 104 are coupled by the switching module 106. The switching module 106 can be coupled to a measurement system of the riser card 100 (not shown). In at least one embodiment, the riser card 100 can support PCIe 1×4 and 2×2 and allow a user to select the measurement system in order to control the switch module.

The switching module 106 can be a multiplexer (MUX) having a plurality Intergrated Circuits (IC) with multiplexing capability and a routing design configured to avoid propagation delay and allow successful transition of PCIe 1×4 and PCIe 2×2. The switching module 106 can be a chip, a field-programmable gate array (FPGA), or any other controller. The switching module 106 can be any PCIe switch supporting a PCIe high speed signal.

The switching module 106 can allow the riser card 100 to operate a component 114 in a PCIe 1×4 arrangement allowing all of the plurality of data ports 108 to be utilized by one component 114. The switching module 106 can also support PCIe 2×2, allowing a portion of the plurality of data ports 108 to one of the second interfaces 104 and the remaining portion of the plurality of data ports 108 to the other second interface 104. PCIe 2×2 can allow the system to achieve maximum benefits on dual path redundancy, increased performance, and increasing the elasticity of the system structure while lowering the cost of design and overall complexity.

The switching module 106 is coupled to a control port 110 of the first interface 102 and configured for selectably coupling the plurality of data ports to at least one of the second interfaces 104 based on a control signal. When the control signal is low, the system is in PCIe 2×2 and when the control signal is high, the system is in PCIe 1×4. As can be appreciated in FIG. 4, the control port 110 is coupled with switch module_2; however, in other embodiments the control port 110 can be coupled with switch module_1, switch module_2, or a combination thereof.

The switching module 106 can couple a first interface 102 with two second interfaces 104. In the illustrated embodiment, the first interface 102 is shown as an NVMe SSD connector and the second interfaces 104 are shown as M.2 connectors, each receiving an M.2 PCIe SSD component. The switch module 106 has two switch modules switch module_1 106a and switch module_2 106b to support PCIe 1×4 and 2×2. The first interface 102 has a plurality of data ports 108, shown in FIG. 4 as [0,1] and [0,1]/[2,3], couplable with the second interfaces 104 via the switch module. Each second interface 104 can have a corresponding plurality of data ports 116, shown in FIG. 4 as [0,1] and [2,3].

As can be appreciated in FIG. 5, the switch module 106 is in a second routing mode and receives a control signal corresponding to operating the system in PCIe 1×4. The switch module _1 106a connects B1 and A1 while switching module_2 106b connects B2 and A2. Switch module_2 shifts to connect first interface 104 connector [2:3] with component 114 [2:3] allowing PCIe 1×4 for system testing. While FIG. 5 is drawn to B2 of switch module_2 106b connecting with [2,3] of component 114a, other arrangements can be implemented such as C1 of switch module_1 connecting with [2,3] of component 114b, or a combination thereof.

As can be appreciated in FIG. 6, the switch module 106 is in a first routing mode and receives a control signal corresponding to operating the system in PCIe 2×2. In PCIe 2×2, C1 (not shown) of switch module_1 106a is not routing while A1 connects to B1 and A2 of switch module_2 106b connects C2. Switch module_1 106a connects B1 with component 114a, shown as M.2 PCIe SSD_1 [0:1], and switch module_2 106b connects C2 with component 114b, shown as M.2 PCI SSD_2 [0:1]. Each component 114a, 114b receives a portion of the plurality of data ports 108.

In the illustrated embodiment, the plurality of data ports 108 is four [0,1] and [2,3] and the portion of the plurality of data ports is two, [0:1]. Each component 114 is receiving two of the available four data ports. While the illustrated embodiment is drawn to switch module_1 coupling with data ports [0,1] of the first interface 102 and switch module_2 coupling with data ports [2,3], the riser card 100 can be implemented with switch module_1 and switch module_2 reversed.

Figure 7:
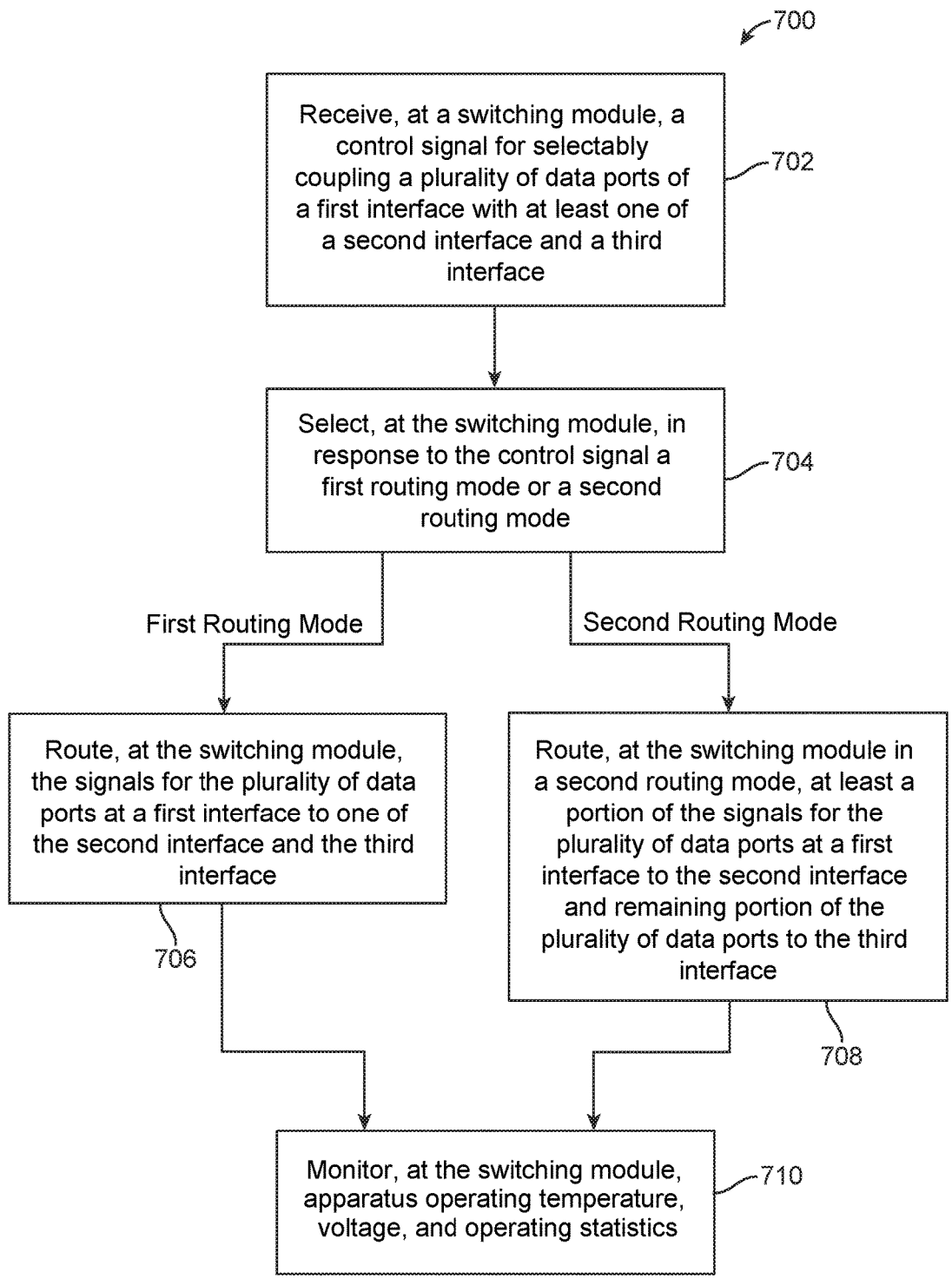
FIG. 7 is a flow chart of a switching method for a riser card in accordance with the present disclosure.

Referring to FIG. 7, a flowchart is presented in accordance with an example embodiment. The example method 700 is provided by way of example, as there are a variety of ways to carry out the method 700. The method 700 described below can be carried out using the configurations illustrated in FIGS. 1-6, for example, and various elements of these figures are referenced in explaining example method 700. Each block shown in FIG. 7 represents one or more processes, methods or subroutines, carried out in the example method 700. Furthermore, the illustrated order of blocks is illustrative only and the order of the blocks can change according to the present disclosure. Additional blocks may be added or fewer blocks may be utilized, without departing from this disclosure. The example method 700 can begin at block 702.

At block 702, an apparatus having a first interface of a first type supporting a plurality of a data ports, and a second interface and a third interface of a second type supporting at least a portion of the plurality of data portions, and a switching module, receives, at the switching module, a control signal for selectably coupling the plurality of data portions of the first interface with at least one of the second interface and the third interface.

At block 704, the switching module selects, in response to the control signal, a first routing mode or a second routing mode.

At block 706, in the first routing mode the switching module routes the signals for the plurality of data ports at a first interface to one of the second interface and the third interface.

At block 708, in the second routing mode the switching module routes at least a portion of the signals for the plurality of data ports to the second interface and the remaining portion of the data ports to the third interface.

At block 710, the switching module can monitor apparatus operating temperature, voltage, and operating statistics.

It is believed the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiments of the disclosure.

What is claimed is:

1. An apparatus, comprising:
   a first interface of a first type supporting a plurality of data ports;
   a second interface of a second type supporting at least a portion of the plurality data ports,
   a third interface of the second type; and
   a first switching module and a second switching module coupled to a control port of the first interface and configured for selectably coupling the plurality of data ports to at least one of the second interface and the third interface based on a signal at the control port, the first switching module being connected to the second interface and the second switching module being connected to the third interface,
   wherein the signal indicates one of a first routing mode and a second routing mode,
   wherein the first routing mode comprises routing signals for the plurality of data ports at the first interface to one of the second interface or third interface, not both the second interface or third interface, and
   wherein the second routing mode comprises routing signals to both the second interface and the third interface, by routing a portion of the plurality of data ports to the second interface and routing signals for a remaining portion of the plurality of data ports to the third interface.

2. The apparatus of claim 1, wherein the plurality of data ports comprises four data ports, and wherein the portion of the plurality of data ports comprises a first two of the plurality of data ports.

3. The apparatus of claim 1, wherein the first interface comprises a U.2 interface and wherein each of the second interface and he third interface comprises a M.2 interface.

4. The apparatus of claim 1, wherein each of the second interface and third interface are configured to couple with a component.

5. The apparatus of claim 4, wherein the component is a PCie SSD.

6. The apparatus of claim 5, wherein the component is hot-swappable, each second interface and third interface allowing removal from the component during operation.

7. The apparatus of claim 1, further comprising a hardware monitor capable of detecting device temperature and voltage usage.

8. A method for supporting an apparatus with two interfaces,
   a first interface of a first type, and a second interface and a third interface of a second type, the method comprising:
   receiving a control signal for selectably coupling a plurality of data ports of a first interface with at least one of a second interface and a third interface, a control port of the first interface coupled to a first switching module and a second switching module, the first switching module being connected to the second interface and the second switching module being connected to the third interface;
   in response to receiving the control signal, selecting a first routing mode or a second routing mode;
   when in the first routing mode:
   routing signals for the plurality of data ports at the first interface to one of the second interface or third interface, not both the second interface or third interface; and
   when in the second routing mode:
   routing at least a portion of the signals for the plurality of data ports at the first interface to both the second interface and the third interface, by routing a portion of the plurality of data ports to the second interface and routing signals for a remaining portion of the plurality of data ports to the third interface.

9. The method of claim 8, further comprising monitoring, at the switching module, apparatus operating temperature, voltage, and operating statistics.

10. The method of claim 8, wherein the plurality of data ports comprises four data ports, and wherein the portion of the plurality of data ports comprises a first two of the plurality of data ports.

11. The method of claim 8, wherein the first interface comprises a U.2 interface and wherein each of the second interface and the third interface comprises a M.2 interface.

* * * * *